United States Patent
Kolasiński

(10) Patent No.: US 9,969,344 B1
(45) Date of Patent: May 15, 2018

(54) METHODS AND SYSTEMS FOR PROVIDING ACCIDENT INFORMATION

(71) Applicant: Robert Bosch GmbH, Stuttgart (DE)

(72) Inventor: Marcin Kolasiński, Łódź (PL)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/435,898

(22) Filed: Feb. 17, 2017

(51) Int. Cl.
*B60Q 1/00* (2006.01)
*B60R 21/015* (2006.01)
*B60R 21/00* (2006.01)

(52) U.S. Cl.
CPC .. *B60R 21/01516* (2014.10); *B60R 21/01544* (2014.10); *B60R 2021/006* (2013.01); *B60R 2021/0027* (2013.01)

(58) Field of Classification Search
CPC ...... B60R 21/01516; B60R 2021/0027; B60R 2021/006; B60R 21/01544
USPC ............... 340/426.18–426.34, 436, 457.1
See application file for complete search history.

(56) References Cited

U.S. PATENT DOCUMENTS

| | | | |
|---|---|---|---|
| 8,818,325 B2 | 8/2014 | Hatton | |
| 8,849,104 B2 | 9/2014 | Eder et al. | |
| 8,880,020 B2 | 11/2014 | Moisanen et al. | |
| 8,971,838 B2 | 3/2015 | Dietz | |
| 9,020,690 B2 | 4/2015 | McKown et al. | |
| 9,220,002 B2 | 12/2015 | Hans | |
| 9,333,913 B1* | 5/2016 | Elders | B60Q 9/008 |
| 2002/0103622 A1* | 8/2002 | Burge | G06F 19/327 702/183 |
| 2014/0009308 A1* | 1/2014 | Abuelsaad | G08G 1/0967 340/905 |
| 2014/0104053 A1* | 4/2014 | Clark, Jr. | B60R 16/02 340/457.1 |
| 2015/0213555 A1* | 7/2015 | Barfield, Jr. | G06Q 40/08 705/4 |
| 2017/0129435 A1* | 5/2017 | Vitet | B60R 21/01512 |

* cited by examiner

*Primary Examiner* — George Bugg
*Assistant Examiner* — Sharmin Akhter
(74) *Attorney, Agent, or Firm* — Michael Best & Friedrich LLP

(57) ABSTRACT

Methods and systems for providing accident information from a vehicle to an emergency responder when a vehicle accident occurs. One system includes a sensor and an electronic processor. The electronic processor is configured to receive vehicle data from the sensor. The electronic processor is also configured to determine a child presence indication of whether a child is present in the vehicle based on the vehicle data. The electronic processor is also configured to determine a state of a windshield of the vehicle based on the vehicle data. The electronic processor is also configured to generate an emergency message including the child presence indication and the state of a windshield of the vehicle. The electronic processor is also configured to automatically transmit the emergency message to an emergency responder.

20 Claims, 3 Drawing Sheets

METHODS AND SYSTEMS FOR PROVIDING ACCIDENT INFORMATION

FIELD

Embodiments relate to methods and systems for providing accident information from a vehicle to an emergency responder when a vehicle accident occurs.

SUMMARY

When a vehicle accident occurs, a message (in example, an eCall) is sent to an emergency responder. However, when one or more occupants of the vehicle are incapacitated, the message sent to an emergency responder may not include information regarding the vehicle accident, such as a number of occupants of the vehicle, a presence of a child or children in the vehicle, a position of the vehicle, and the like. By including such information in the message sent to an emergency responder, the emergency responder will have a better understanding of what to except upon arrival at the vehicle accident, which allows for an appropriate and efficient emergency response.

Accordingly, embodiments described herein relate to methods and systems for providing accident information from a vehicle to an emergency responder when a vehicle accident occurs. For example, one embodiment provides a method for providing accident information from a vehicle to an emergency responder when a vehicle accident occurs. The method includes receiving, with an electronic processor, vehicle data. The method also includes determining, with the electronic processor, a child presence indication of whether a child is present in the vehicle based on the vehicle data. The method also includes determining, with the electronic processor, a state of a windshield of the vehicle based on the vehicle data. The method also includes generating, with the electronic processor, an emergency message including the child presence indication and the state of a windshield of the vehicle. The method also includes automatically transmitting, with the electronic processor, the emergency message to an emergency responder.

Another embodiment provides a system for providing accident information from a vehicle to an emergency responder when a vehicle accident occurs. The system includes a sensor and an electronic processor. The electronic processor is configured to receive vehicle data from the sensor. The electronic processor is also configured to determine a child presence indication of whether a child is present in the vehicle based on the vehicle data. The electronic processor is also configured to determine a state of a windshield of the vehicle based on the vehicle data. The electronic processor is also configured to generate an emergency message including the child presence indication and the state of a windshield of the vehicle. The electronic processor is also configured to automatically transmit the emergency message to an emergency responder.

Other aspects of various embodiments will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
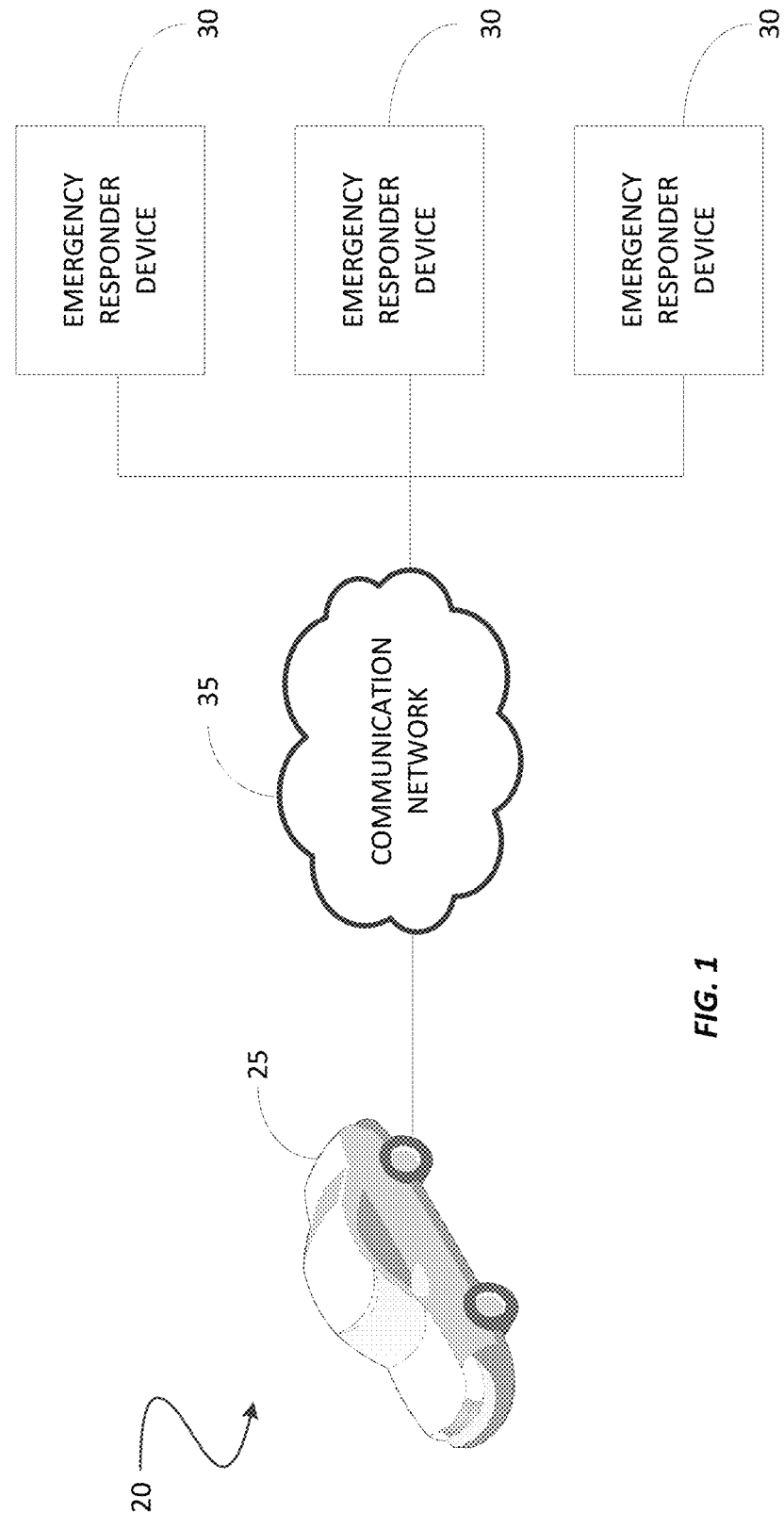
FIG. 1 illustrates a system for providing accident information from a vehicle to an emergency responder device when a vehicle accident occurs in accordance with some embodiments.

FIG. 1 illustrates a system 20 for providing accident information according to some embodiments. As illustrated in FIG. 1, the system 20 includes a vehicle 25 and one or more emergency responder devices 30 (referred to herein collectively as "the emergency responder devices 30" and individually as "an emergency responder device 30"). The vehicle 25 and the emergency responder devices 30 communicate over one or more wired or wireless communication networks 35. The communication network 35 may include the Internet, a cellular network, a public network, a private network, or other wired or wireless network. In some embodiments, the system 20 includes fewer, additional, or different components than those illustrated in FIG. 1 in various configurations and may perform additional functionality than the functionality described herein. For example, the vehicle 25 may communicate with any number of emergency responder devices 30 and three emergency responder devices 30 are illustrated in FIG. 1 purely for illustrative purposes. Also, in some embodiments, a vehicle 25 and an emergency responder device 30 may communicate through one or more interim devices.

The emergency responder devices 30 include one or more desktop computers, laptop computers, tablet computers, terminals, smart telephones, smart televisions, smart wearables, servers, databases, other types of communication devices, or a combination thereof. The emergency responder devices 30 may be associated with an emergency responder, a group of emergency responders, or a combination thereof. For example, an emergency responder device 30 may be associated with an emergency responder operator, such as a 911 operator. The emergency responder devices 30 may include similar electrical components as described below with respect to a vehicle controller (with the addition of one or more input devices, output devices, or a combination thereof for interfacing with a user, such as an emergency responder, of an emergency responder device 30) although not illustrated or described herein.

Figure 2:
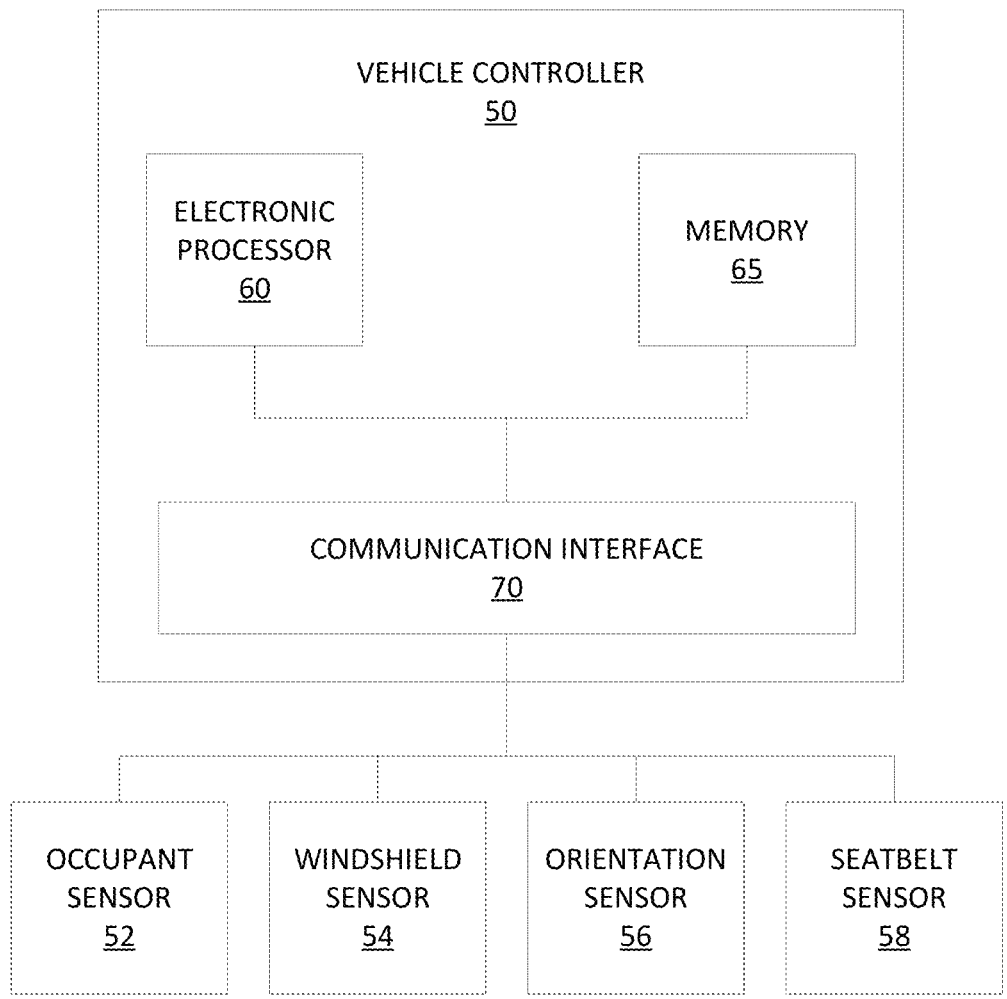
FIG. 2 illustrates a vehicle controller of the system of FIG. 1 in accordance with some embodiments.

The vehicle 25 may include a vehicle controller 50, an occupant sensor 52, a windshield sensor 54, an orientation sensor 56, and a seatbelt sensor 58, as illustrated in FIG. 2. In some embodiments, the vehicle 25 includes fewer, additional, or different components than those illustrated in FIG. 2 in different configurations. For example, the vehicle 25 may include multiple occupant sensors 52, multiple windshield sensors 54, multiple orientation sensors 56, multiple seatbelt sensors 58, or another type of sensor.

As illustrated in FIG. 2, the vehicle controller 50 includes an electronic processor 60 (for example, a microprocessor, an application specific integrated circuit, or other suitable electronic device), a memory 65 (for example, one or more non-transitory computer-readable storage mediums), and a communication interface 70. The electronic processor 60, the memory 65, and the communication interface 70 communicate wirelessly, over one or more data connections or buses, or a combination thereof. The vehicle controller 50 illustrated in FIG. 2 represents one example, and, in some embodiments, the vehicle controller 50 may include fewer, additional, or different components in different configurations than illustrated in FIG. 2. Also, in some embodiments, the vehicle controller 50 performs functionality in addition to the functionality described herein.

The electronic processor 60 is configured to retrieve instructions from the memory 65 and execute instructions to perform a set of functions, including the methods described herein. For example, in some embodiments, the electronic processor 60 executes instructions for providing accident information from the vehicle 25 to an emergency responder device 30 when a vehicle accident occurs. The memory 65 may include combinations of different types of memory, such as read-only memory ("ROM"), random access memory ("RAM"), or another non-transitory computer readable medium. As noted above, the memory 65 stores instructions executed by the electronic processor 60. The memory 65 may also store data, such as vehicle data collected by the occupant sensor 52, the windshield sensor 54, the orientation sensor 56, the seatbelt sensor 58, or a combination thereof. Accordingly, the memory 65 may store firmware, one or more applications, program data, filters, rules, one or more program modules, and other executable instructions or data.

The communication interface 70 allows the vehicle controller 50 to communicate with devices external to the vehicle controller 50 (for example, receive input from and provide output to devices external to the vehicle controller 50 directly or indirectly). For example, the vehicle controller 50 may communicate with the occupant sensor 52, the windshield sensor 54, the orientation sensor 56, the seatbelt sensor 58, the emergency responder devices 30, or a combination thereof through the communication interface 70. In some embodiments, the communication interface 70 may include a port for receiving a wired connection to with the occupant sensor 52, the windshield sensor 54, the orientation sensor 56, the seatbelt sensor 58, or a combination thereof. Alternatively or in addition, the communication interface 70 may include a transceiver for establishing a wireless connection to the occupant sensor 52, the windshield sensor 54, the orientation sensor 56, the seatbelt sensor 58, the emergency responder devices 30, or a combination there of (for example, over the communication network 35). Alternatively or in addition, the communication interface 70 may communicate with a communication bus (for example, a controller area network ("CAN")) to indirectly communicate with, for example, the occupant sensor 52, the windshield sensor 54, the orientation sensor 56, and the seatbelt sensor 58.

As noted above, the occupant sensor 52, the windshield sensor 54, the orientation sensor 56, and the seatbelt sensor 58 collect vehicle data associated with the vehicle 25. In some embodiments, the occupant sensor 52, the windshield sensor 54, the orientation sensor 56, and the seatbelt sensor 58 include sensors preexisting in the vehicle 25.

The occupant sensor 52 collects occupant data associated with one or more occupants of the vehicle 25. In some embodiments, the occupant sensor 52 is an image sensor positioned within a passenger compartment of the vehicle 25. The occupant sensor 52 may be configured to collect occupant data via object recognition. For example, the occupant sensor 52 may recognize one or more occupants of the vehicle 25, the presence of a car seat in the vehicle 25 (in example, a baby car seat or a toddler car seat), the presence of an occupant in the car seat, and the like. In some embodiments, the occupant sensor 52 is a pressure sensor, a weight sensor, or the like positioned in a seat of the vehicle 25. The occupant sensor 52 may be configured to collect occupant data by detecting a weight associated with a seat of the vehicle 25. For example, the occupant sensor 52 may be positioned in a driver's seat of the vehicle 25 and detect the weight associated with the driver's seat of the vehicle 25 to be 210 pounds. In some embodiments, the vehicle 25 includes multiple occupant sensors 52 positioned in each seat of the vehicle 25 for detecting a weight associated with each seat of the vehicle 25.

The windshield sensor 54 collects windshield data associated with a windshield of the vehicle 25, such as a front windshield, a rear windshield, and the like. In some embodiments, the windshield sensor 54 is a force sensor configured to measure the force of a windshield of the vehicle 25 (for example, a tension or stress of a windshield). In some embodiments, the windshield sensor 54 is an infrared sensor configured to monitor a shape of a windshield of the vehicle 25. For example, the windshield sensor 54 may transmit and receive an infrared signal along a windshield of the vehicle 25. When the shape of a windshield of the vehicle 25 is unchanged, the infrared signal is not obstructed. When the shape of a windshield of the vehicle 25 is changed (for example, is cracked), the infrared signal is obstructed. Accordingly, when the windshield sensor 54 includes an infrared sensor, the windshield sensor 54 may monitor a shape of a windshield of the vehicle 25 based on whether an infrared signal is obstructed or not obstructed. In some embodiments, the windshield sensor 54 is a conductivity sensor configured to monitor a conductivity of a windshield of the vehicle 25. The orientation sensor 56 collects orientation data associated with the vehicle 25, such as a right-side up orientation, an up-side down orientation, and the like. The orientation sensor 56 may include, for example, a position sensor, an accelerometer, a three-dimensional accelerometer, and the like. The seatbelt sensor 58 collects seatbelt data associated with a seat of the vehicle 25, such as whether a seatbelt is fastened or unfastened.

Figure 3:
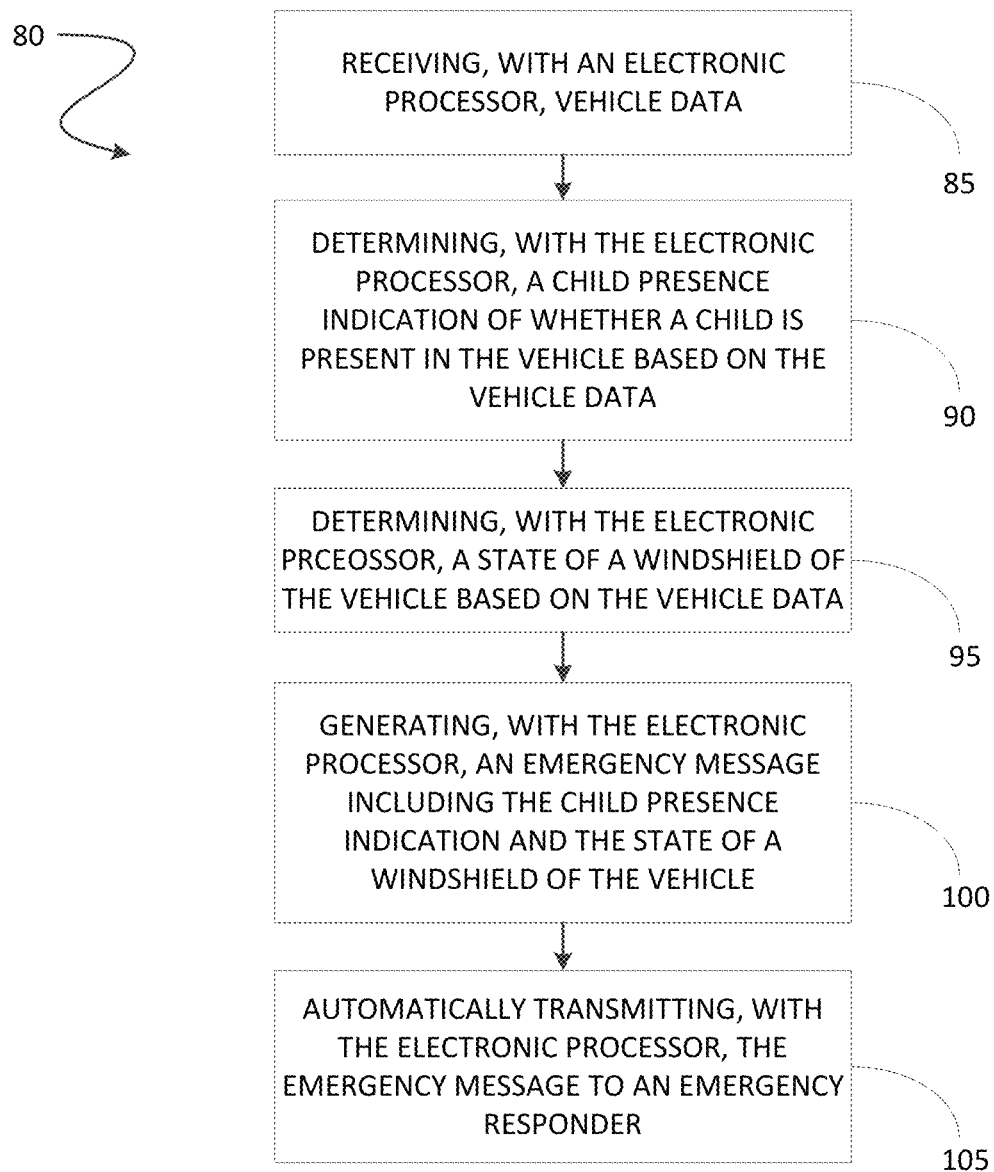
FIG. 3 is a flowchart illustrating a method for providing accident information from a vehicle to an emergency responder device when a vehicle accident occurs performed by the system of FIG. 1 in accordance with some embodiments.

As noted above, the electronic processor 60 included in the vehicle controller 50 executes instructions for providing accident information from the vehicle 25 to the emergency responder devices 30 when a vehicle accident occurs. In particular, the electronic processor 60 executes instructions to perform the method 80 illustrated in FIG. 3 to provide accident information from the vehicle 25 to the emergency responder devices 30 when a vehicle accident occurs. As illustrated in FIG. 3, the method 80 includes receiving, with the electronic processor 60, vehicle data (at block 85). As noted above, the vehicle data may include occupant data, windshield data, orientation data, seatbelt data, or a combination thereof. In some embodiments, the vehicle data includes additional or different vehicle data. The electronic processor 60 may receive the vehicle data from the occupant sensor 52, the windshield sensor 54, the orientation sensor 56, the seatbelt sensor 58, or a combination thereof via the communication interface 70 of the vehicle controller 50. In some embodiments, the vehicle data received from the occupant sensor 52, the windshield sensor 54, the orientation sensor 56, and the seatbelt sensor 58 is stored in the memory 65 of the vehicle controller 50.

After the electronic processor 60 receives the vehicle data, the electronic processor 60 determines a child presence indication of whether a child is present in the vehicle 25 based on the vehicle data (at block 90). As noted above, the vehicle data may include occupant data collected by the occupant sensor 52. As mentioned above, the occupant data may include objects recognized in the vehicle 25 by the occupant sensor 52. Accordingly, in some embodiments, the electronic processor 60 determines whether a child is present in the vehicle 25 based on the objects recognized by the occupant sensor 52. For example, when the occupant data indicates that a car seat, an occupant in the car seat, or a combination thereof was recognized in the vehicle 25 by the occupant sensor 52, the electronic processor 60 may determine that a child is present in the vehicle 25. In some embodiments, the occupant data includes a weight associated with a seat of the vehicle 25. The electronic processor 60 may determine a child is present in the vehicle 25 by comparing that weight to a predetermined weight threshold. The predetermined weight threshold may represent an average maximum weight of a child. When a weight included in the occupant data is less than the predetermined weight threshold, the electronic processor 60 may determine a child is present in the vehicle 25. When a weight included in the occupant data is greater than or equal to the predetermined weight threshold, the electronic processor 60 may determine a child is not present in the vehicle 25. For example, when the predetermined threshold is 50 pounds and a weight associated with a seat of the vehicle 25 is 30 pounds, the electronic processor 60 may determine that a child is present in the vehicle 25.

The electronic processor 60 also determines a state of a windshield of the vehicle 25 based on the vehicle data (at block 95). As noted above, the vehicle data may include windshield data collected by the windshield sensor 54. Based on the windshield data, the electronic processor 60 may determine a state of a windshield of the vehicle 25. The state of a windshield of the vehicle 25 may include, for example, an intact state, a cracked state, and the like. In some embodiments, the windshield data includes a current force value of a windshield of the vehicle 25. The electronic processor 60 may determine the state of a windshield of the vehicle 25 by comparing the current force value with a predetermined force threshold. The predetermined force threshold may represent a force value associated with an intact windshield (in example, a windshield that is not cracked). When the current force value is less than the predetermined force threshold, the electronic processor 60 may determine the state of a windshield of the vehicle 25 to be a cracked state. When the current force value is greater than or equal to the predetermined force threshold, the electronic processor 60 may determine the state of a windshield of the vehicle 25 to be an intact state.

In some embodiments, the windshield data includes an indication of whether a shape of a windshield of the vehicle 25 has changed based on whether an infrared signal is obstructed or not obstructed. When the infrared signal is obstructed, the electronic processor 60 may determine the state of a windshield of the vehicle 25 to be a cracked state. When the infrared signal is not obstructed, the electronic processor 60 may determine the state of a windshield of the vehicle 25 to be an intact state. In some embodiments, the windshield data includes a current conductivity value of a windshield of the vehicle 25. The electronic processor 60 may determine the state of a windshield of the vehicle 25 by comparing the current conductivity value with a predetermined conductivity value. The predetermined conductivity value may represent a conductivity value associated with an intact windshield. When the current conductivity value is not the same as the predetermined conductivity value, the electronic processor 60 may determine the state of a windshield of the vehicle 25 to be a cracked state. When the current conductivity value is the same as the predetermined conductivity value, the electronic processor 60 may determine the state of a windshield of the vehicle 25 to be an intact state. In some embodiments, the predetermined conductivity value represents a range of conductivity values associated with an intact windshield. Accordingly, when the current conductivity value is not within that range of conductivity values, the electronic processor 60 may determine the state of a windshield of the vehicle 25 to be an intact state. When the current conductivity value is not within that range of conductivity values, the electronic processor 60 may determine the state of a windshield of the vehicle 25 to be a cracked state.

The electronic processor 60 may also determine a number of total occupants of the vehicle 25 based on the vehicle data. The electronic processor 60 may determine the number of total occupants of the vehicle 25 based on the occupant data collected by the occupant sensor 52. As mentioned above, the occupant data may include objects recognized in the vehicle 25 by the occupant sensor 52. Accordingly, in some embodiments, the electronic processor 60 determines the number of total occupants of the vehicle 25 based on the number of occupants recognized by the occupant sensor 52. For example, when the occupant data indicates that the occupant sensor 52 recognized four occupants, the electronic processor 60 may determine that the number of total occupants of the vehicle 25 is four. Alternatively or in addition, when the occupant data includes a weight associated with a seat of the vehicle 25, the electronic processor 60 may determine the number of total occupants of the vehicle 25 based on that weight. For example, when the occupant data includes three weights associated with three seats of the vehicle 25, the electronic processor 60 may determine that the number of total occupants of the vehicle 25 is three. In some embodiments, the electronic processor 60 may compare a weight to a predetermined weight threshold to determine whether the weight is indicative of a weight associated with an occupant sitting in the seat or a weight associated with an object on the seat.

The electronic processor 60 may also determine an orientation of the vehicle 25 based on the vehicle data. The electronic processor 60 may determine the orientation of the vehicle 25 based on the orientation data collected by the orientation sensor 56. As noted above, the orientation of the vehicle 25 may include, for example, a right-side up orientation, an up-side down orientation, a passenger-side down orientation, a driver-side down orientation, and the like.

The electronic processor 60 may also determine an occupant seatbelt indication of whether each occupant of the vehicle 25 has a fastened seatbelt. The electronic processor 60 may determine the occupant seatbelt indication based on the seatbelt data collected by the seatbelt sensor 58 and the occupant data collected by the occupant sensor 52. For example, the electronic processor 60 may determine the total number of occupants of the vehicle 25, as described above, and a total number of fastened seatbelts of the vehicle 25. The electronic processor 60 may compare the total number of fastened seatbelts of the vehicle 25 with the total number of occupants of the vehicle 25. When the total number of fastened seatbelts and the total number of occupants is the same, the electronic processor 60 may determine that each occupant of the vehicle 25 has a fastened seatbelt. When the total number of fastened seatbelts and the total number of occupants is not the same, the electronic processor 60 may determine that each occupant of the vehicle does not have a fastened seatbelt. In some embodiments, the electronic processor 60 may determine how many occupants of the vehicle 25 do not have a fastened seatbelt by calculating the difference between the total number of occupants and the total number of fastened seatbelts. In some embodiments, the electronic processor 60 associates the occupant seatbelt indication with a vehicle seat position (for example, a driver seat position, a front passenger seat position, and the like). For example, the electronic processor 60 may determine that a seatbelt associated with a driver seat position is fastened and a seatbelt associated with a passenger seat position is unfastened.

In some embodiments, the electronic processor 60 determines an ejected occupant indication of whether an occupant of the vehicle 25 was ejected from the vehicle 25 during the vehicle accident. The electronic processor 60 may determine the ejected occupant indication based on the state of a windshield of the vehicle 25 and the occupant seatbelt indication. For example, when the state of a windshield is a cracked state and the occupant seatbelt indication indicates that each occupant of the vehicle 25 does not have a fastened seatbelt, the electronic processor 60 may determine an ejected occupant indication indicating that at least one occupant of the vehicle 25 was ejected from the vehicle 25 during the vehicle accident.

Returning to FIG. 3, the electronic processor 60 then generates an emergency message (at block 100). In some embodiments, the electronic processor 60 generates more than one emergency message. The emergency message may include the child presence indication, the state of a windshield, the number of total occupants, the occupant seatbelt indication, the orientation of the vehicle 25, the ejected occupant indication, other vehicle accident information, or a combination thereof. In some embodiments, the emergency message includes an accident request based on the vehicle data. The accident request may include, for example, a request for particular equipment, a request for a particular number of emergency response vehicles, a request for a particular type of emergency response vehicle, another request, or a combination thereof. For example, when the electronic processor 60 determines that the total number of occupants of the vehicle 25 is four, the electronic processor 60 may generate an emergency message including a request for four ambulances. As a further example, when the electronic processor 60 determines that the orientation of the vehicle 25 is an up-side down orientation, the electronic processor 60 may generate an emergency message including a request for an appropriate type of emergency response vehicle for reorienting the vehicle 25 to a right-side up orientation. In some embodiments, the electronic processor 60 generates the accident request separate from the emergency message. For example, the electronic processor 60 may generate the emergency message and generate a separate accident request.

After generating the emergency message, the electronic processor 60 automatically transmits the emergency message to an emergency responder (at block 105). The emergency responder may include, for example, an emergency operator, a police officer, a deputy sheriff, a firefighter, an emergency medical personnel (for example, a paramedic), another emergency responder, or a combination thereof. The electronic processor 60 may automatically transmit the emergency message when one or more occupants of the vehicle 25 are incapacitated.

In some embodiments, before the electronic processor 60 automatically transmits the emergency message to an emergency responder, the electronic processor 60 identifies an emergency response category based on the vehicle data. The emergency response category may include, for example, a police department category, a fire department category, an emergency medical services ("EMS") category, another emergency response category, or a combination thereof. Based on the identified emergency response category, the electronic processor 60 may automatically transmit the emergency message to an emergency responder included in the identified emergency response category. In other words, by identifying an emergency response category based on the vehicle data, the electronic processor 60 may transmit the emergency message to an appropriate emergency responder as opposed to all possible emergency responders.

As noted above, the electronic processor 60 may generate a second emergency message based on the vehicle data. In some embodiments, the electronic processor 60 may automatically transmit the second emergency message to an emergency responder in a second emergency response category. The second emergency response category may be the same as a first emergency response category or may be different from the first emergency response category. The content of the second emergency message may be the same as or different from the content of the first emergency message. In some embodiments, the content of the second emergency message is specific to the second emergency response category and the content of the first emergency message is specific to the first emergency response category.

For example, the electronic processor 60 may identify a fire department category as the first emergency response category and an EMS category as the second emergency response category. The electronic processor 60 may automatically transmit a first emergency message having fire department specific accident information to an emergency responder included in the fire department category, such as a firefighter. Similarly, the electronic processor 60 may automatically transmit a second emergency message having EMS specific accident information to an emergency responder included in the EMS category, such as a paramedic. In other words, based on the vehicle data, the electronic processor 60 may identify that accident information (vehicle data) may be relevant to some emergency responders and may be irrelevant to other emergency responders, and automatically transmit one or more emergency messages accordingly.

Various features and advantages of certain embodiments are set forth in the following claims.

What is claimed is:

1. A method for providing accident information from a vehicle to an emergency responder when a vehicle accident occurs, the method comprising:
   receiving, with an electronic processor, vehicle data;
   determining, with the electronic processor, a child presence indication of whether a child is present in the vehicle based on the vehicle data;
   determining, with the electronic processor, a state of a windshield of the vehicle based on the vehicle data;
   determining a number of total occupants of the vehicle;
   determining an occupant seatbelt indication of whether each occupant of the vehicle has a fastened seatbelt;
   determining an orientation of the vehicle;
   determining an ejected occupant indication of whether an occupant of the vehicle was ejected from the vehicle during the vehicle accident when (i) the state of a windshield of the vehicle is a cracked state and (ii) the occupant seatbelt indication indicates that each occupant of the vehicle does not have a fastened seatbelt;
   generating, with the electronic processor, an emergency message including the child presence indication, the state of a windshield of the vehicle, and the ejected occupant indication; and
   automatically transmitting, with the electronic processor, the emergency message to an emergency responder.

2. The method of claim 1, wherein determining the occupant seatbelt indication includes
   determining a number of total seatbelts fastened in the vehicle based on the vehicle data, and
   comparing the number of total seatbelts fastened in the vehicle with the number of total occupants of the vehicle,
   wherein the occupant seatbelt indication indicates that each occupant of the vehicle has a fastened seatbelt when the number of total seatbelts fastened in the vehicle is the same as the number of total occupants of the vehicle.

3. The method of claim 1, wherein determining the state of a windshield of the vehicle includes determining the state of a windshield of the vehicle is a cracked state when at least one selected from a group consisting of a current force of the windshield is less than a predetermined force threshold, an infrared signal is obstructed, and a conductivity value of the windshield changes.

4. The method of claim 1, wherein determining the child presence indication includes comparing a weight of an occupant of the vehicle to a predetermined weight threshold, wherein the child presence indication indicates that a child is present in the vehicle when the weight of an occupant of the vehicle less than the predetermined weight threshold.

5. The method of claim 1, further comprising:
   identifying an emergency response category based on the vehicle data,
   wherein automatically transmitting the emergency message includes automatically transmitting the emergency message to an emergency responder included in the emergency response category.

6. The method of claim 5, further comprising:
   generating a second emergency message based on the vehicle data;
   identifying a second emergency response category based on the vehicle data; and
   automatically transmitting the second emergency message to an emergency responder included in the second emergency response category.

7. A system for providing accident information from a vehicle to an emergency responder when a vehicle accident occurs, the system comprising:
   a sensor; and
   an electronic processor configured to
      receive vehicle data from the sensor,
      determine a child presence indication of whether a child is present in the vehicle based on the vehicle data,
      determine a state of a windshield of the vehicle based on the vehicle data,
      generate an emergency message including the child presence indication and the state of a windshield of the vehicle, and
      automatically transmit the emergency message to an emergency responder,
   wherein the state of a windshield of the vehicle is a cracked state when at least one selected from a group consisting of a current force of the windshield is less than a predetermined force threshold, an infrared signal is obstructed, and a conductivity value of the windshield changes.

8. The system of claim 7, wherein the electronic processor is further configured to generate an accident request based on the vehicle data, the accident request including at least one selected from a group consisting of a request for particular equipment, a request for a particular number of emergency response vehicles, and a request for a particular type of emergency response vehicle.

9. The system of claim 7, wherein the electronic processor is further configured to
   determine a number of total occupants of the vehicle,
   determine an occupant seatbelt indication of whether each occupant of the vehicle has a fastened seatbelt,
   determine an ejected occupant indication of whether an occupant of the vehicle was ejected from the vehicle during the vehicle accident, and
   determine an orientation of the vehicle.

10. The system of claim 9, wherein the emergency message further includes at least one selected from a group consisting of the number of total occupants, the occupant seatbelt indication, the ejected occupant indication, and the orientation of the vehicle.

11. The system of claim 9, wherein the ejected occupant indication indicates that at least one occupant of the vehicle was ejected from the vehicle during the vehicle accident when (i) the state of a windshield of the vehicle is the cracked state and (ii) the occupant seatbelt indication indicates that each occupant of the vehicle did not have a fastened seatbelt.

12. The system of claim 9, wherein the electronic processor is further configure to
determine a number of occupants of the vehicle that do not have a fastened seatbelt by calculating a difference between the number of total occupants of the vehicle and a number of total fastened seatbelts of the vehicle, wherein the emergency message includes the number of occupants of the vehicle that do not have a fastened seatbelt.

13. The system of claim 9, wherein the electronic process is configured to determine the occupant seatbelt indication by
determining a number of total seatbelts fastened in the vehicle based on the vehicle data, and
comparing the number of total seatbelts fastened in the vehicle with the number of total occupants of the vehicle,
wherein the occupant seatbelt indication indicates that each occupant of the vehicle has a fastened seatbelt when the number of total seatbelts fastened in the vehicle is the same as the number of total occupants of the vehicle.

14. The system of claim 7, wherein the electronic processor is further configured to
identify an emergency response category based on the vehicle data, and
automatically transmit the emergency message to an emergency responder included in the emergency response category.

15. The system of claim 14, wherein the electronic processor is further configured to
generate a second emergency message based on the vehicle data,
identify a second emergency response category based on the vehicle data, and
automatically transmit the second emergency message to an emergency responder included in the second emergency response category.

16. The system of claim 15, wherein the second emergency message has content different than content of the first emergency message, wherein the content of the first emergency message is specific to the first emergency response category and the content of the second emergency message is specific to the second emergency response category.

17. The system of claim 7, wherein the electronic processor is configured to determine the child presence indication by comparing a weight of an occupant of the vehicle to a predetermined weight threshold, wherein the child presence indication indicates that a child is present in the vehicle when the weight of an occupant of the vehicle less than the predetermined weight threshold.

18. A vehicle controller for providing accident information from a vehicle to an emergency responder when a vehicle accident occurs, the vehicle controller comprising:
an electronic processor configured to
receive vehicle data from the sensor,
determine a child presence indication of whether a child is present in the vehicle based on the vehicle data,
determine a state of a windshield of the vehicle based on the vehicle data,
determine an occupant seatbelt indication of whether each occupant of the vehicle has a fastened seatbelt,
determine a number of total occupants of the vehicle,
determine an ejected occupant indication of whether an occupant of the vehicle was ejected from the vehicle during the vehicle accident, wherein the ejected occupant indication indicates that at least one occupant of the vehicle was ejected from the vehicle during the vehicle accident when (i) the state of a windshield of the vehicle is a the cracked state and (ii) the occupant seatbelt indication indicates that each occupant of the vehicle did not have a fastened seatbelt,
generate an emergency message including the child presence indication, the state of a windshield of the vehicle, and the ejected occupant indication, and
automatically transmit the emergency message to an emergency responder.

19. A vehicle controller for providing accident information from a vehicle to an emergency responder when a vehicle accident occurs, the vehicle controller comprising:
an electronic processor configured to
receive vehicle data from the sensor,
determine a child presence indication of whether a child is present in the vehicle based on the vehicle data,
determine a state of a windshield of the vehicle based on the vehicle data,
determine a number of total occupants of the vehicle,
determine a number of occupants of the vehicle that do not have a fastened seatbelt by calculating a difference between the number of total occupants of the vehicle and a number of total fastened seatbelts of the vehicle,
generate an emergency message including the child presence indication, the state of a windshield of the vehicle, and the number of occupants of the vehicle that do not have a fastened seatbelt, and
automatically transmit the emergency message to an emergency responder.

20. A system for providing accident information from a vehicle to an emergency responder when a vehicle accident occurs, the system comprising:
a sensor; and
an electronic processor configured to
receive vehicle data from the sensor,
determine a child presence indication of whether a child is present in the vehicle based on the vehicle data,
determine a state of a windshield of the vehicle based on the vehicle data,
determine an occupant seatbelt indication of whether each occupant of the vehicle has a fastened seatbelt,
determine an ejected occupant indication of whether an occupant of the vehicle was ejected from the vehicle during the vehicle accident when (i) the state of a windshield of the vehicle is a cracked state and (ii) the occupant seatbelt indication indicates that each occupant of the vehicle does not have a fastened seatbelt,
generate an emergency message including the child presence indication, the state of a windshield of the vehicle, and the ejected occupant indication, and
automatically transmit the emergency message to an emergency responder.

* * * * *